Sept. 4, 1962 R. C. BOWES ET AL 3,052,845
VOLTAGE MEASURING APPARATUS
Filed March 12, 1958 2 Sheets-Sheet 1

Sept. 4, 1962   R. C. BOWES ET AL   3,052,845
VOLTAGE MEASURING APPARATUS
Filed March 12, 1958   2 Sheets-Sheet 2
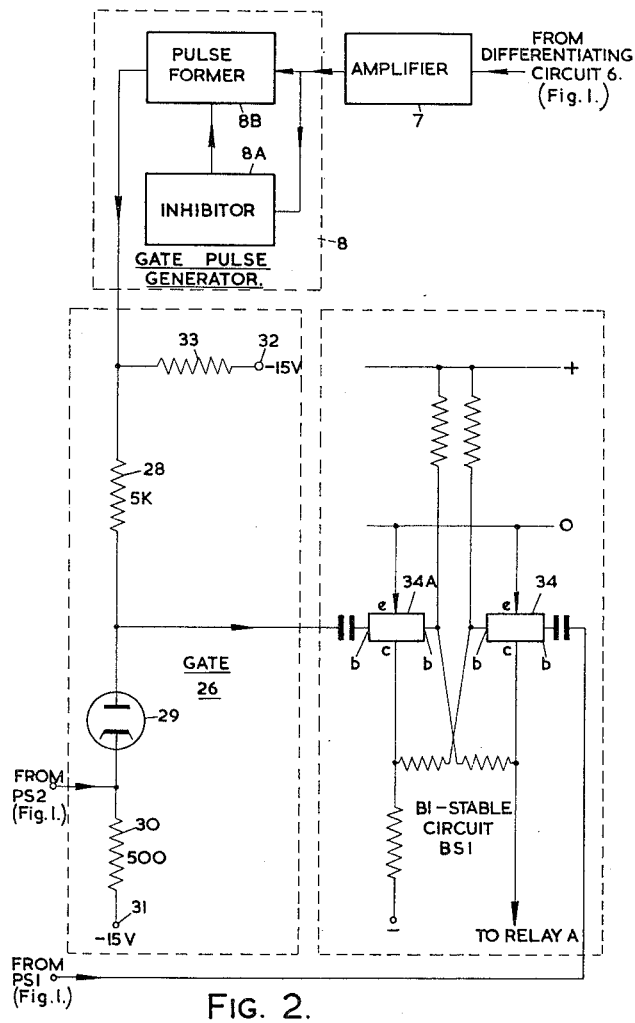
FIG. 2.
FIG. 3.
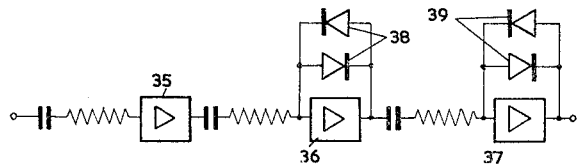

United States Patent Office 3,052,845
Patented Sept. 4, 1962

3,052,845
VOLTAGE MEASURING APPARATUS
Robert Colin Bowes and John C. Gill, Worcester England, assignors to National Research Development Corporation, London, England, a British corporation
Filed Mar. 12, 1958, Ser. No. 720,884
Claims priority, application Great Britain Mar. 14, 1957
7 Claims. (Cl. 324—99)

This invention relates to apparatus for measuring voltage.

In the data transmission and electronic computer fields there is widespread use of the binary numbering system. Such a system, instead of being the more commonplace decimal one i.e. based on powers of ten, is a binary one i.e. based on powers of two.

For many purposes it is desirable to be able to feed voltage information directly from the point of measurement to a transmission system, or a computer, in which binary numbers are used. Some form of conversion unit is therefore provided or else an apparatus which can measure voltage and provide an indication of the measured value directly in terms of a binary number. Such apparatus generally proves to be complicated in design and construction and expensive to produce.

It is therefore an object of the present invention to provide a simplified and economical apparatus for measuring voltage in terms of a binary number.

According to the invention an apparatus for measuring voltage comprises, a voltage comparison circuit adapted, when an input voltage and a reference voltage are applied to it, to provide a signal showing whichever of the two voltages is the greater, means for establishing the reference voltage comprising connecting means for connecting additively individual voltage sources of a set of sources whose magnitudes form a binary sequence, the individual voltage sources being connected in sequence to provide decreasing binary increments of voltage, and removable in response to an overriding signal after connection, and means fed from the comparison circuit for applying an overriding signal to the connecting means after each addition of an individual voltage source in sequence to remove the source if the signal from the comparison circuit shows that the reference voltage has become greater than the input voltage, whereby the source remains connected if before the succeeding source has been connected the reference voltage is less than the input voltage and is disconnected if the reference voltage is greater, and indicating means associated with the voltage sources for indicating which sources remain connected and which are disconnected after the sequence of binary increments has been applied whereby the magnitude of the input voltage is indicated in terms of a binary number.

In order to make the invention clearer an example of an apparatus for measuring voltage in terms of a binary number will now be described with reference to the accompanying drawings, in which:

FIG. 2 shows in more detail certain elements of the circuit of FIG. 1, and

FIG. 3 shows schematically the arrangement of an amplifier used in the circuit of FIG. 1.

Figure 1:
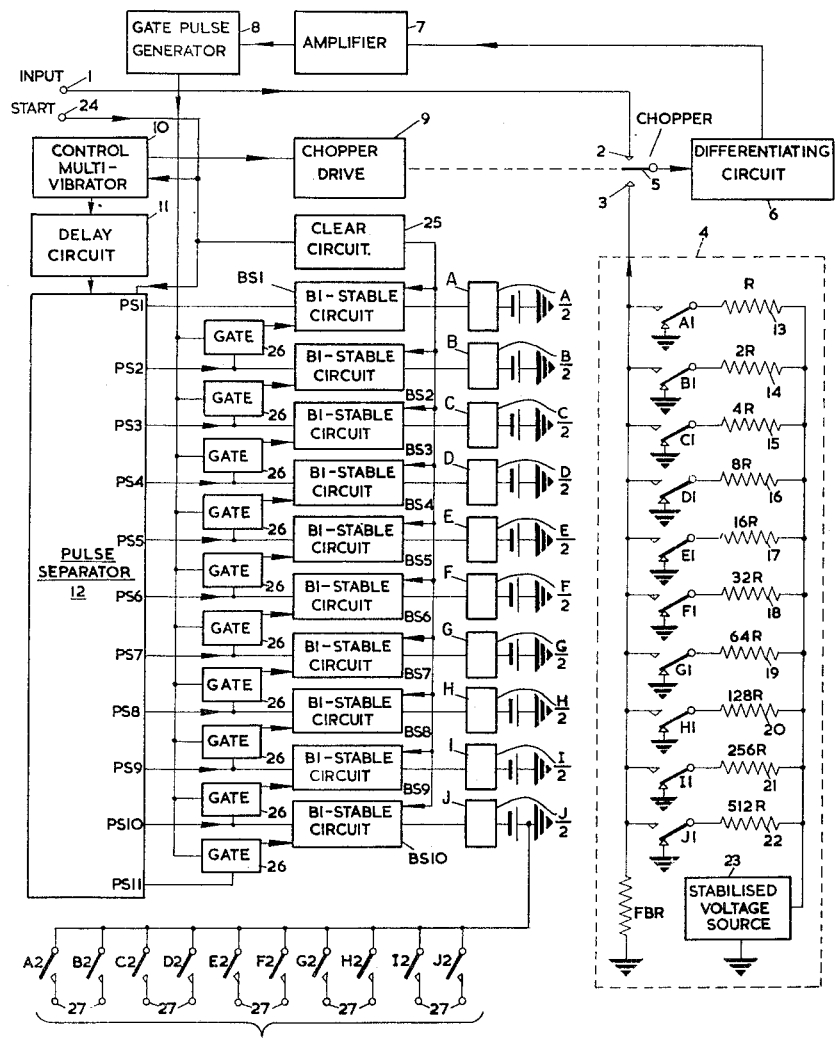
FIG. 1 shows schematically a circuit diagram of a binary digital voltmeter.

In the binary digital voltmeter of FIG. 1 an input voltage applied at an input terminal 1 is connected to one fixed contact 2 of a chopper whose other fixed contact 3 is supplied from a source of reference voltage 4. A moving contact 5 of the chopper feeds to a comparison circuit comprising a differentiating circuit 6, an amplifier 7, followed by a gate pulse generator 8. The moving contact 5 of the chopper is driven by a chopper drive arrangement 9 which is controlled by a control multi-vibrator 10.

The moving contact 5 of the chopper drives so that the input voltage at the terminal 1 and the reference voltage from the reference source 4 are alternately fed to the differentiating circuit 6. If the input voltage is greater than the reference voltage a negative step is fed to the differentiating circuit 6 when the chopper contact 5 moves over from the contact 2 to the contact 3, if the input voltage is less than the voltage fed from the reference source 4 a positive step will be fed to the differentiating circuit 6 when the chopper contact 5 moves. Thus a negative or a positive pulse is fed to the amplifier 7 accordingly as the input voltage is respectively greater than or less than the voltage of the reference source 4; when the contact 5 moves in the opposite direction from the contact 3 to the contact 2, the pulse fed to the amplifier 7 is negative or positive accordingly as the input voltage is respectively less than or greater than the reference voltage, the direction of comparison having thus been reversed.

The pulses from the amplifier 7 are fed to the gate pulse generator 8 which in response to only the positive pulses generates a long gating pulse, the use of which will be referred to later.

The control multivibrator 10 feeds an output through a delay circuit 11 to a pulse separator 12. The pulse separator 12 has eleven outputs PS1–PS11 and if a train of eleven pulses is generated by the multivibrator 10 the first pulse will appear, after a delay due to the delay circuit 11, at the output PS1, the second pulse similarly at the output PS2 and so on until the eleventh pulse appears at the output PS11. The outputs (PS1–PS10) of the pulse separator 12 are applied each to a different bistable circuit BS1–BS10. The bistable circuits BS1–BS10 each control a different relay A–J. In order to avoid additional complication of FIG. 1 of the drawings the relays A–J have been drawn and designated following a useful method known as the detached contact method. In this method, the relay windings are shown quite schematically as rectangular blocks having the necessary leads and the relay contacts are shown as individual switch contacts placed in most convenient parts of the figure. The relays are designated by letters of the alphabet and the contacts are designated by numbers each preceded by the letter of the corresponding relay. Thus each contact remains unambiguously identified with its relay even though it is positioned in the circuit drawing some distance away.

To ensure that the circuit discloses all the detached contacts of a given relay, a line is drawn under the designation of the relay and below that a number is inserted showing the number of contacts the relay possesses. It will be seen in FIG. 1 of the drawings that dotted lines associating a relay with its contacts and a large number of long and crossing connections are thus avoided. Thus in response to a train of pulses originating at the multivibrator 10 the 10 relays A–J are operated in sequence.

Contacts A1–J1 of the relays A–J serve to connect a series of resistors 13–22 in series with a stabilised voltage source 23 to the contact 3 of the chopper. An earthed resistor FBR is also connected to the contact 3. This arrangement constitutes the reference source 4; in operation the successive operation of the relays A–J connects the different resistors 13–22 to the contact 3 by means of the relay contacts A1–J1. The connection of the first resistor 13 provides a given reference voltage at the contact 3 and succeeding resistors in the sequence 14–22 each determine an increment of resistance which will pass a corresponding increment of current from the source 23 and by virtue of Ohm's Law produce an increment of voltage which can be added at the contact 3 when a corresponding relay contact is made. The magnitude of each increment of resistance is half that of a preceding increment.

In operation a start signal is applied to a terminal 24 and from thence goes to the control multivibrator 10 and a clear circuit 25. The clear circuit 25 is connected to all of the bistable circuits BS1–BS10 and ensures that initially these are all in the same condition of stability with the relays A–J unoperated. In this condition there is no reference voltage available at the contact 3; the stabilised voltage source 23 is connected to earth by the resistors 13–22 at the made contacts of the relay contacts A1 to J1.

The first operative edge of the output of the control multivibrator 10 operates the chopper drive 9 so that after a small delay the chopper contact 5 swings over from the contact 3, where it has been assumed to rest, to the contact 2. The input to the differentiating circuit 6 is thus established at the level of the input voltage applied to the input terminal 1.

After a further delay due to the delay circuit 11 an output pulse due to the first operative edge of the output of the control multivibrator 10 appears at the output PS1 of the pulse separator 12 and is fed to the bistable circuit BS1; the relay A operates. The relay A at its contact A1 connects the stabilised voltage source 23 through the resistance 13 to the contact 3 of the chopper and so establishes on the contact 3 a stabilised reference voltage whose value is effectively determined by the resistance 13(R).

Following this action the next operative edge from the output of the control multivibrator 10 operates the chopper drive 9 and the chopper contact 5 swings back over to the contact 3. This operation of the contact 5 can cause an output of the gate pulse generator 8 but for reasons which will be clearer later such an output is of no consequence at this stage. However at the third operative edge of the control multivibrator 10 the chopper drive 9 is again operative and the chopper contact 5 swings over from the contact 3 to the contact 2. Now occurs the first effective comparison between the voltage of the reference source and the input voltage and according to the results of the comparison a positive or a negative pulse is fed out by the differentiating circuit 6; a corresponding pulse is fed to the gate pulse generator 8 from the amplifier 7. If the result of the comparison is that the reference voltage at the contact 3 is less than the input voltage a positive edge is fed to the differentiating circuit 6 which feeds a positive pulse to the amplifier 7; a negative pulse thereupon appears at the output of the amplifier 7 and is fed to the gate pulse generator 8; the gate pulse generator 8 does not however feed out a gating pulse.

Gates 26, which are connected between the outputs PS2–PS11 of the pulse separator 12 and the bistable circuits BS1–BS10 respectively, are controlled by the gate pulse generator 8 so that, when a gate pulse is present in the output of the gate pulse generator 8, they are open and any pulse appearing at an output, PS2–PS11, of the pulse separator 12 is routed to the bistable circuit, BS1–BS10 respectively, which corresponds to the preceding output, PS1–PS10 again respectively, of the pulse separator 12. In the present case there is no gating pulse output from the gate pulse generator 8 and the gate 26 connecting the output PS2 to the bistable circuit BS1 remains closed.

The third operative edge in the output of the control multivibrator 10 passes through the delay circuit 11 and a corresponding output pulse appears at the second output PS2 of the pulse separator 12, this output pulse passes to the bistable circuit BS2 and the relay B operates. Because the gate 26 is closed no pulse passes from the output PS2 to the preceding bistable circuit BS1 and so the relay A remains operated and the resistor 13 remains connected to the contact 3. When the relay B operates the contact B1 connects the resistor 14(2R) to the contact 3 with the result that an increment of voltage is added to the reference source 4 of magnitude equal to half that established previously when the contact A1 operated.

On the fourth operative edge of the output of the control multivibrator 10 the chopper drive 9 is again operated and the chopper contact 5 moves over this time from the contact 2 to the contact 3. As with the second operative edge of the multivibrator output any comparison which may take place is of no consequence and can be ignored.

On the fifth operative edge of the control multivibrator 10 the chopper drive 9 causes the contact 5 to swing back from the contact 3 to the contact 2 and an effective comparison is again made between the reference and input voltages. If it is now taken that a negative step is applied (that is, assume the reference source is now greater than the input voltage), a negative pulse passes from the differentiating circuit 6 to the amplifier 7, a positive pulse passes from the amplifier 7 to the gate pulse generator 8 and a long gate pulse is generated and fed to the gates 26. The gates 26 thereupon open and, in particular, a path is provided from the output PS3 of the pulse separator 12 to the bistable circuit BS2 associated with the preceding output PS2. Thus, when, due to the delay circuit 11, a pulse corresponding to the fifth effective edge of the control multivibrator 10 appears at the output PS3 the gates 26 are still open and it is fed to the bistable circuit BS3 for the relay C to operate; and, moreover, it is also fed, via that gate 26 which is connected to the output PS3, to the bistable circuit BS2 and so effects the release of the relay B.

The result is that the increment of voltage which was added to the reference source upon the operation of the relay B is now removed—when the comparison was made it proved to be too large—and the operation of the relay C connects at the contact C1 a further resistor 15 so that an increment of voltage determined by the resistor 15 is substituted in its place.

This operation of comparison between input and reference source voltages to determine whether an added increment should remain continues as successive odd numbered operative edges appear in the output of the control multivibrator 10 and originate successive pulses in the outputs PS4–11 of the pulse separator 12. It will be seen that for a pulse at an output PS of the pulse separator 12 an increment of voltage is added at the reference source and a decision is made whether the preceding increment should remain or be removed. By these operations of successive approximation, using increments of reference source voltage which are related in a binary sequence, the succeeding digits of a binary number are determined to represent the magnitude of the input voltage. The second contacts A2 to J2 of the relays A to J thus provide means of reading off as a binary output the measured value of the input voltage at the terminal 1. The contacts A2 to J2 are connected between earth and terminals 27 to provide a binary output in parallel form.

Thus, after a voltage has been measured, a binary number representing its value is represented as a sequence of grounded or non-grounded conditions (equivalent to binary digits, say "1" or "0") on the terminals 27 designated "binary output" in FIG. 1. For instance if relays A, B, G, H and J, remain operated after a measurement sequence of pulses has occurred a binary number 1100001101 (contacts A2, B2, G2, H2 and J2 operated) is obtained as a measure of the voltage.

The start signal which is applied to the terminal 24 starts off the control multivibrator 10 which thereupon runs long enough to generate 22 operative edges; that is so that eleven output pulses, each corresponding to the odd numbered operative edges, are produced by the pulse generator 12, one pulse following the other along the line of the outputs PS1 to PS11. Thus a measure of an input voltage to ten binary places is obtained each time a start signal is applied.

Pulse separators of a kind suitable for use with the invention are known and in most cases an initial signal is required to set the separator to its first pulse; so conveniently the start signal is also fed to the pulse separator 12.

A more detailed description of the gate 26, the bistable circuit BS1 and the gate pulse generator 8 is possible with reference to FIG. 2.

The amplifier 7 and the gate pulse generator 8 control the operation of the gate 26. The output of the gate pulse generator 8 is connected via a resistor 28 to the anode of a diode 29 and through the diode 29 and a resistor 30 to a negative source 31. The connection to the gate 26 from the output PS2 of the pulse separator is made at the junction of the resistor 30 and the cathode of the diode 29. In the absence of an output from the gate pulse generator 8 the anode of the diode 29 of the gate 26 is maintained negative by a connection to a negative source 32 via a resistor 33.

The output of the gate 26 is taken from the anode of the diode 29 and feeds to the bistable circuit BS1; the bistable circuit BS1 consists as shown of a symmetrical multivibrator circuit in which transistors 34 and 34A are the active elements. The collector of the transistor 34 is connected to the coil of the relay A. One input to the bistable circuit BS1 is the output of the gate 26 already referred to and the other input is that from the output PS1 of the pulse separator 12.

The circuit operates as follows: The first pulse appearing from the pulse separator at the output PS1 sets a bistable circuit BS1 so that the transistor 34 turns on and the relay A is operated. The second pulse from the output PS2 of the pulse separator is applied to the cathode of the diode 29 but is only able to become effective as an output at the anode of the diode 29 if, at the same time, the gate pulse generator 8 has generated a gate pulse; the gate pulse corresponds to a negative pulse from the differentiating circuit 6 (FIG. 1) and offsets the effect of the negative source 32 so that a pulse appearing from the output PS2 and proceeding to the cathode of the diode 29 will be, so to speak, allowed through the gate and onwards to the base of the transistor 34A of the bistable circuit BS1. The result will be that the bistable circuit BS1 will change its state and the relay A will release. This, of course, is the circumstance when, during comparison it turns out that the input voltage is less than the reference source voltage and an added increment of voltage is to be removed.

At this stage it should be noted that a positive pulse from the differentiating circuit 6, resulting in a negative pulse at the output of the amplifier 7, does not cause the gate pulse generator 8 to generate a gate pulse; accordingly no output from the pulse separator at PS2 can be effective to change the state of the bistable circuit BS1. This, of course, is the circumstance when the comparison shows that the increment of voltage added at the reference source brings the reference source voltage to be less than the input voltage and the added increment must not be removed.

An additional refinement is provided where the amplifier 7 is liable to produce on its negative output pulses such a large degree of overshoot that unwanted positive pulses are also produced. A positive pulse inhibitor 8A is provided in the gate pulse generator 8 and fed in parallel with the input of a pulse former circuit 8B.

When the positive overshoot occurs after a negative pulse the pulse inhibitor 8A operates to prevent the gate pulse generator 8 from generating a gate pulse output. A positive output pulse from the amplifier 7 is, however, not affected and the pulse generator 8 generates a gate pulse as described.

It is convenient here also to refer now to the comparisons which inevitably must have taken place when the chopper contact 5 has changed over in response to the second, fourth and so forth, operative edges of the output of the multivibrator 10. From FIG. 2 it will be clear that, in these circumstances, whatever output will have resulted from the pulse generator 8 on such a comparison taking place, there is then no effective output from the pulse separator at its outputs PS1, 2 . . . ; these outputs only being available on the first, third, and so forth, operative edges of the multivibrator 10.

In a binary digital voltmeter of the kind described the amplification of the amplifier 7, within wide limits, does not closely affect the accuracy of the voltmeter. The very nature of the on-off sensed signal which is fed to the amplifier 7 ensures that this is so. However the amplifier 7 must be able to withstand a reasonably wide variation of input voltages without its signal distorting. For this reason the amplifier 7 is preferably made up as shown in FIG. 3 where three distinct amplifying stages 35, 36, 37 are employed and one limiter comprising suitably biassed diodes 38 is placed across the stage 36 and a second limiter comprising suitably biassed diodes 39 is connected across the stage 37. For small signals all three stages are fully operative and the limiters are not effective; when, however, the input signal to the amplifier 37 increases above a given amount the limiter 39 becomes effective and prevents the amplifier overloading. At a still higher value of input signal the limiter 38 becomes effective in a similar way.

The accuracy of the voltmeter is dependent to some extent upon the stability achieved by the stabilised voltage source 23 (FIG. 1). Stabilised sources are available such as the standard cells commonly used with potentiometer type voltage measuring apparatus and will serve adequately for the purposes of the invention but other sources may be used.

In some circumstances an output of the type which is serial in time may be advantageous. The output of the amplifier (7, FIG. 1) to which the chopper feeds via the differentiating circuit (6, FIG. 1) is in the form of positive and negative pulses accordingly as the added increment of voltage at the reference source 4 is to remain or be removed. Thus this output provides a serial output if means are provided for selecting output pulses corresponding only to comparisons made on the third, fifth and so forth operative edges of the control multivibrator 10. This means would be controlled conveniently from the multivibrator 10.

We claim:

1. An apparatus for measuring voltage in binary code comprising, in combination, a voltage comparison circuit for producing an output signal when an input voltage and a reference voltage are applied to said circuit and a predetermined one of said two voltages is higher than the other, a control signal generator having a plurality of outputs, each output providing one of a time-sequence of control signals, controlling means for controlling the magnitude of said reference voltage in a sequence of binary steps corresponding to the time-sequence of control signals, comprising a plurality of voltage sources in binary sequence, and a plurality of connection means, each said connection means connected between one of the voltage sources and a reference voltage input of said voltage comparison circuit and coupled to a different output of said control signal generator for controllably connecting the sources in binary sequence to said comparison circuit, a plurality of auxiliary connection means coupled to the voltage comparison circuit and each providing a connection between a different output of the control signal generator and the connection means coupled to the preceding output thereof in sequence, for controlling in response to the output signal of the voltage comparison circuit corresponding to a given control signal the continued connection of said connection means previously connected by the preceding control signal, and binary output means coupled to said connection means for indicating the states of said connection means thereby giving a measure of the reference voltage, and of the input voltage, in binary code.

2. An apparatus for measuring voltage as claimed in claim 1, wherein the control signal generator comprises a signal source for providing a sequence of signals and a signal separator to which the sequence of signals is applied via a delay circuit and which separates the signals of the sequence into the separate generator outputs, and the signal source is also connected to and actuates the voltage comparison circuit means, the delay circuit delaying the control signals whereby comparison of the input and reference voltages takes place before removal of a voltage step under the control of the voltage comparison circuit.

3. An apparatus for measuring voltage as claimed in claim 2, wherein the control signal generator comprises pulse generating means for generating a sequence of pulses, the controlling means being operated by successive pulses to add binary voltage steps in sequence, and the switching circuits are gate circuits each for applying a pulse of the pulse sequence to a connection unit to remove the individual voltage step added by the previous pulse when the voltage comparison circuit means shows that the addition of the step had raised the reference voltage above the input voltage.

4. An apparatus for measuring voltage as claimed in claim 3, wherein the voltage comparison circuit comprises means responsive to the edges of the pulses of the sequence for switching the input voltage and the reference voltage alternately to the input of a gate pulse generating means, and each connection unit comprises a bistable circuit having two inputs the connection from a pulse separator output being made to one input and the connection from a gate circuit being made to the second input, the gate pulse generating means being connected to the gate circuit and generating a gate operating signal whenever the direction of change of voltage at the comparison means is that which occurs with the reference voltage greater than the input voltage during the front edge of a pulse of the sequence.

5. An apparatus for measuring voltage as claimed in claim 4, wherein the means responsive to the pulse edge comprises a movable chopper contact driven by the pulse generating means and alternately connecting with contacts connected to the input and the reference voltages, and a circuit connection between the chopper contact and the gate-pulse generating means.

6. An apparatus as claimed in claim 5, wherein the gate-pulse generating means includes a multi-stage amplifier having limiter means applied to, at least, its final stage.

7. An apparatus as claimed in claim 6, wherein the gate-pulse generating means comprises a pulse forming circuit for forming gate pulses in response to an input of a given polarity only and an inhibiter circuit which inhibits the formation of unwanted pulses due to overswing in the multi-stage amplifier.

References Cited in the file of this patent

UNITED STATES PATENTS

| | | |
|---|---|---|
| 2,625,822 | Nichols | Jan. 20, 1953 |
| 2,762,038 | Lubkin | Sept. 4, 1956 |
| 2,784,396 | Kaiser | Mar. 5, 1957 |
| 2,845,597 | Perkins | July 29, 1958 |

OTHER REFERENCES

Publication: "A Digital Potentiometer," by Dean and Nettell in Electronic Engineering, February 1956, pages 66–69.